United States Patent
Xie et al.

(10) Patent No.: US 10,292,004 B2
(45) Date of Patent: May 14, 2019

(54) METHOD, DEVICE AND MEDIUM FOR ACQUIRING LOCATION INFORMATION

(71) Applicant: Beijing Xiaomi Mobile Software Co., Ltd., Haidian District, Beijing (CN)

(72) Inventors: Yan Xie, Beijing (CN); Tian Ren, Beijing (CN); Yue Cheng, Beijing (CN)

(73) Assignee: BEIJING XIAOMI MOBILE SOFTWARE CO., LTD., Haidian District, Beijing ( * ) Notice: Subject to any disclaimer, the term of this patent is extended or adjusted under 35 U.S.C. 154(b) by 7 days.

(21) Appl. No.: 15/409,548

(22) Filed: Jan. 19, 2017

(65) Prior Publication Data

US 2017/0223494 A1    Aug. 3, 2017

(30) Foreign Application Priority Data

Jan. 29, 2016  (CN) .......................... 2016 1 0064139

(51) Int. Cl.
*H04W 4/02* (2018.01)
*H04W 52/02* (2009.01)
*H04W 4/04* (2009.01)

(52) U.S. Cl.
CPC ............ *H04W 4/02* (2013.01); *H04W 4/043* (2013.01); *H04W 52/0261* (2013.01); *Y02D 70/00* (2018.01); *Y02D 70/142* (2018.01); *Y02D 70/144* (2018.01); *Y02D 70/164* (2018.01); *Y02D 70/166* (2018.01); *Y02D 70/26* (2018.01)

(58) Field of Classification Search
CPC ....... H04W 4/02; H04W 52/02; H04W 4/043; H04W 52/0261; H04W 12/08; H04W 64/00; H04W 4/021; H04W 4/025; H04W 8/245; H04W 12/12; H04L 67/00; H04L 63/14; H04L 41/026; H04L 43/0811; H04L 41/0233; H04L 41/22; H04L 41/0253; G06F 21/60
USPC ............................................... 455/411, 456.1
See application file for complete search history.

(56) References Cited

U.S. PATENT DOCUMENTS 9,113,304 B1 *   8/2015   Ramaswamy ........ H04W 4/025
2008/0186162 A1 *  8/2008   Rajan ..................... G06F 21/88
                                                    340/539.13
(Continued)

FOREIGN PATENT DOCUMENTS

CN     102147725 A     8/2011
CN     102980570 A     3/2013
(Continued)

OTHER PUBLICATIONS

Office action from EPO for EP application 17153805.
Office action from SIPO for CN application 201610064139.1.
ISR and written opinions for PCT application 2016098334.

*Primary Examiner* — Christopher M Brandt
(74) *Attorney, Agent, or Firm* — Jun He Law Offices P.C.; James J. Zhu (57) ABSTRACT

A method, device and medium for acquiring location information are provided. The method includes: acquiring a remaining power amount of a mobile terminal; acquiring location information of the mobile terminal when the remaining power amount of the mobile terminal is less than a preset threshold; and transmitting the location information to a target receiving terminal.

15 Claims, 3 Drawing Sheets

(56) References Cited

U.S. PATENT DOCUMENTS

| | | | | |
|---|---|---|---|---|
| 2008/0305770 | A1* | 12/2008 | Kasama | H04M 1/66 |
| | | | | 455/411 |
| 2010/0130229 | A1* | 5/2010 | Sridhara | G01S 19/49 |
| | | | | 455/456.1 |
| 2013/0237191 | A1* | 9/2013 | Mahaffey | H04L 41/0253 |
| | | | | 455/411 |
| 2014/0128032 | A1* | 5/2014 | Muthukumar | H01Q 3/00 |
| | | | | 455/411 |
| 2015/0042852 | A1* | 2/2015 | Lee | H04N 5/2258 |
| | | | | 348/262 |
| 2017/0085770 | A1* | 3/2017 | Cui | H04N 5/2355 |

FOREIGN PATENT DOCUMENTS

| | | |
|---|---|---|
| CN | 203135524 U | 8/2013 |
| CN | 103428340 A | 12/2013 |
| CN | 103593049 A | 2/2014 |
| CN | 104754503 A | 7/2015 |
| CN | 105101141 A | 11/2015 |
| CN | 105738921 A | 7/2016 |
| WO | 2009035592 A1 | 3/2009 |

* cited by examiner

METHOD, DEVICE AND MEDIUM FOR ACQUIRING LOCATION INFORMATION

CROSS-REFERENCE TO RELATED APPLICATIONS

This application is based on and claims priority to Chinese Patent Application No. 201610064139.1, filed on Jan. 29, 2016, the entire contents of which are incorporated herein by reference.

TECHNICAL FIELD

The present disclosure generally relates to a field of wireless communication technology, and more particularly, to a method, device and medium for acquiring location information.

BACKGROUND

Mobile terminals, such as a mobile phone, a tablet PC, etc., are electronic devices commonly used in daily life.

There is a case that a user is unable to obtain a current location of the mobile terminal for some reasons, for example when the user forgets where the mobile terminal is placed, or when the mobile terminal is stolen. Typically, by installing a specified application in the mobile terminal, the user transmits a controlling instruction to the specified application through another device when needs to find the mobile terminal. The specified application will acquire location information of the mobile terminal and feeds back the acquired location information to the device that transmits the controlling instruction after receiving the controlling instruction.

However, the specified application is triggered to acquire the location information of the mobile terminal only when the user transmits the controlling instruction to the mobile terminal through another device, which thereby is inconvenient for operation. Further, the mobile terminal cannot successfully receive the controlling instruction when it is power off due to low power amount. Thus, the user is unable to find the mobile terminal.

SUMMARY

According to a first aspect of embodiments of the present disclosure, there is provided a method for acquiring location information. The method includes: acquiring a remaining power amount of a mobile terminal; acquiring the location information of the mobile terminal when the remaining power amount of the mobile terminal is less than a preset threshold; and transmitting the location information to a target receiving terminal.

According to a second aspect of embodiments of the present disclosure, there is provided a device for acquiring location information. The device includes: a processor; and a memory configured to store an instruction executable by the processor, wherein the processor is configured to: acquire a remaining power amount of a mobile terminal; acquire location information of the mobile terminal when the remaining power amount of the mobile terminal is less than a preset threshold; and transmit the location information to a target receiving terminal.

According to a third aspect of embodiments of the present disclosure, there is provided a non-transitory computer-readable storage medium having stored therein instructions that, when executed by a processor of a terminal device, causes the terminal device to perform a method for acquiring location information, and the method includes: acquiring a remaining power amount of a mobile terminal; acquiring the location information of the mobile terminal when the remaining power amount of the mobile terminal is less than a preset threshold; and transmitting the location information to a target receiving terminal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims.

The method according to embodiments of the present disclosure may be applied in a mobile terminal having a positioning function and/or an image capturing function. The mobile terminal may be, for example, a mobile phone, a tablet PC, an e-reader, a multimedia player device, a wearable device, etc. For convenience of description, in the embodiments of the method, illustration hereinafter is made by taking as an example the use of an implementing subject of each step as the mobile terminal, which cannot be construed to limit the present disclosure.

Figure 1:
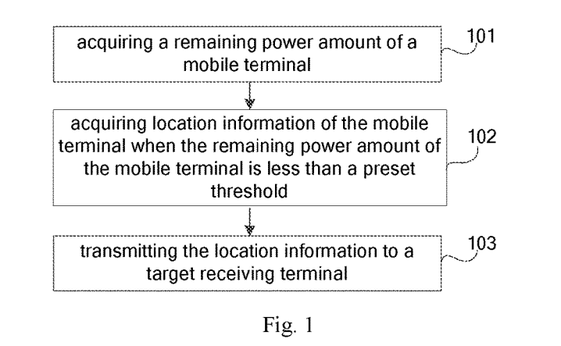
FIG. 1 is a flow chart showing a method for acquiring location information, according to an example embodiment.

FIG. 1 is a flow chart of a method for acquiring location information, according to an example embodiment. Referring to FIG. 1, the method includes the following steps.

In step 101, a remaining power amount of a mobile terminal is acquired.

In step 102, the location information of the mobile terminal is acquired when the remaining power amount of the mobile terminal is less than a preset threshold.

In step 103, the location information is transmitted to a target receiving terminal.

In summary, by acquiring the position information and transmitting the acquired location information to the target receiving terminal when the remaining power amount of the mobile terminal is less than the preset threshold, the method provided in this embodiment avoids that the location information will be acquired only when a user manually sends a controlling instruction to the mobile terminal, which is inconvenient in operation, and the user is unable to find the mobile terminal when the mobile terminal is power off due to a low power amount. The mobile terminal automatically acquires and transmits the acquired location information to the target receiving terminal under a low power amount, which requires no manual trigger and control from the user and simplifies the operation on the one hand, and helps the user find out the mobile terminal by automatically providing the location information before the mobile terminal is power off on the other hand.

Figure 2:
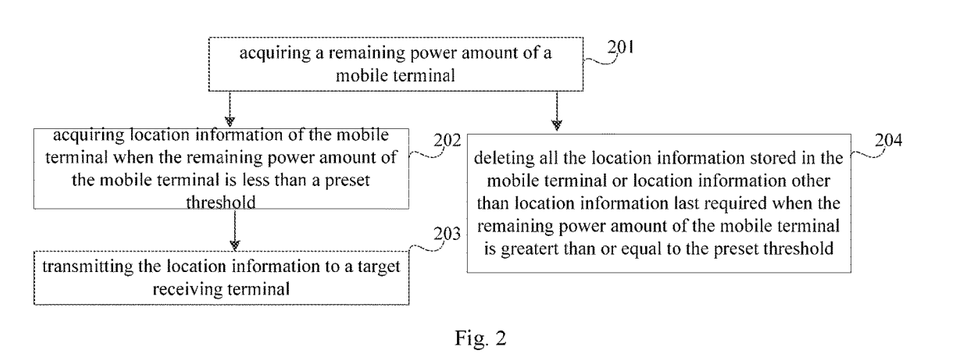
FIG. 2 is a flow chart showing a method for acquiring location information, according to another example embodiment.

FIG. 2 is a flow chart showing a method for acquiring location information, according to another example embodiment. In this embodiment, illustration is made by taking the method being applied in the mobile terminal as an example. The method may include the following steps.

In step 201, a remaining power amount of a mobile terminal is acquired.

The mobile terminal acquires its own remaining power amount at the present moment. It is assumed that the remaining power amount of the mobile terminal at the present moment is 15%.

In step 202, location information of the mobile terminal is acquired when the remaining power amount of the mobile terminal is less than a preset threshold.

The mobile terminal acquires its own location information at the present moment when its own remaining power amount is less than the preset threshold. The mobile terminal is in a low power amount state when the remaining power amount of the mobile terminal is less than the preset threshold. The preset threshold may be set by the system default, or customized by the user. For example, the preset threshold of the remaining power amount is 20%.

The location information is acquired by the mobile terminal in such two possible implementations as follows.

In one possible implementation, the mobile terminal acquires its own current geographic location by a positioning technology. For example, the mobile terminal acquires its own current geographic location by GPS (Global Positioning System).

In another possible implementation, the mobile terminal captures an image of the environment where the mobile terminal is currently located by a camera. Alternatively, the mobile terminal acquires a screen orientation of the mobile terminal at the present moment. A front camera is activated and captures the image of the environment where the mobile terminal is currently located if the screen orientation of the mobile terminal is upward. A rear camera is activated and captures the image of the environment where the mobile terminal is currently located if the screen orientation of the mobile terminal is downward. The mobile terminal may acquire its own screen orientation by a gyroscope or a gradienter. For example, when the mobile terminal is negligently left under a table by the user, if the mobile terminal detects that its own screen orientation at the present moment is upward, the front camera is activated and captures the image of the environment; if the mobile terminal detects that its own screen orientation at the present moment is downward, the rear camera is activated and captures the image of the environment. The user may subsequently determine the location where the mobile terminal is left based on the image of the environment. The image captured by the camera typically is a picture. Through the above ways, an effectiveness of capture of the image of the environment by the mobile terminal may be improved. In addition, considering the mobile terminal is in low power amount state, the size of the image captured by the mobile terminal may be set into a minimum unit so as to reduce power consumption and traffic consumption of transferring the image in a later stage.

It should be noted that, the screen orientation of the mobile terminal is upward, which does not mean that the screen of the mobile terminal is completely parallel to the horizontal plane and in an upward state, but means that the screen of the mobile terminal may be at an angle to the horizontal plane and is in an upward state. Similarly, the screen orientation of the mobile terminal is downward, which does not mean that the screen of the mobile terminal is completely parallel to the horizontal plane and in a downward state, but means that the screen of the mobile terminal may be at an angle to the horizontal plane and is in a downward state. In addition, when the screen of the mobile terminal is perpendicular to the horizontal plane, the mobile terminal may activate a default camera and the default camera captures the image of the environment where the mobile terminal is currently located. The mobile terminal may preset the front camera or the rear camera as the default camera.

In addition, the mobile terminal may acquire the location information in a predetermined time interval or every time a predetermined power is consumed. The adjacent predetermined time intervals may be same or different. Two adjacent predetermined power consumptions may be identical or different. For example, the mobile terminal acquires the current location information once a minute. For another example, the mobile terminal acquires the current location information when the remaining power amount is 15%, 10%, 5%, and 1%, respectively. Through the above ways, the current location of the mobile terminal may be tracked in real time when the mobile terminal is in the low power amount state, thus helping the user to accurately determine a lost location of the mobile terminal.

In addition, to avoid excessive power consumption or insufficient memory caused by frequently acquiring the location information (such as taking pictures), the mobile terminal will detect whether its location is changed after acquiring the location information. The mobile terminal will re-execute the step of acquiring the current location information of the mobile terminal if the location of the mobile terminal is changed; and will not re-acquire its current location information if the location of the mobile terminal is unchanged. The mobile terminal may detect whether its location is changed by an accelerating sensor.

In step 203, the location information is transmitted to a target receiving terminal.

The mobile terminal transmits the location information to the target receiving terminal. The target receiving terminal may be a cloud server or a target terminal. For example, the mobile terminal transmits the location information to a preset instant communication client, a preset social application client or a preset email client. The target receiving terminal can be preset by the user, for example, the user presets one or more friends in the instant communication application as the target receiving terminal and the mobile terminal will transmit the acquired location information to the instant communication clients corresponding to the one or more friends. Then, the user may determine the location of the mobile terminal and find out the mobile terminal in accordance with the location information received by the target receiving terminal.

In addition, the mobile terminal will transmit the location information to the target receiving terminal every time the location information is acquired.

After the above step 201, the method for acquiring the location information may further includes a step 204.

In step 204, all the location information stored in the mobile terminal or location information other than location information last acquired is deleted when the remaining power amount of the mobile terminal is greater than or equal to the preset threshold.

In practice, to save a memory space of the mobile terminal, the mobile terminal will delete all the location information stored in the mobile terminal or merely keep the location information last acquired when it detects that the remaining power amount is greater than or equal to the preset threshold.

Alternatively, every time the mobile terminal acquires location information, the location information last acquired will be deleted so as to avoid storing excessive failed location information and waste memory space.

The mobile terminal may be provided with a loss preventing mode under a low power amount state. The mobile terminal executes the above steps provided in the present embodiment after the user activates the loss preventing mode. The loss preventing mode will be automatically closed when the remaining power amount of the mobile terminal is greater than or equal to the preset threshold.

In summary, by acquiring the position information and transmitting the acquired location information to the target receiving terminal when the remaining power amount of the mobile terminal is less than the preset threshold, the method provided in this embodiment avoids that the location information will be acquired only when the user manually sends a controlling instruction to the mobile terminal, which is inconvenient in operation, and the user cannot find the mobile terminal when the mobile terminal is power off due to a low power amount. The mobile terminal automatically acquires the location information and transmits the acquired location information to the target receiving terminal under a low power amount, which requires no manual trigger and control from the user and simplifies the operation on the one hand, and helps the user to find out the mobile terminal by automatically providing the location information before the mobile terminal is power off on the other hand.

In addition, the mobile terminal will detect whether the location of the mobile terminal is changed after acquiring the location information of the mobile terminal and re-execute the step of acquiring the current location information of the mobile terminal if the location of the mobile terminal is changed, thus avoiding excessive power consumption or insufficient memory caused by frequently acquiring the location information without affecting the validity of the location information.

The following embodiments of a device of the present disclosure may be used to perform embodiments of the method of the present disclosure. For details not disclosed in embodiments of the device of the present disclosure, reference is made to embodiments of the method of the present disclosure.

Figure 3:
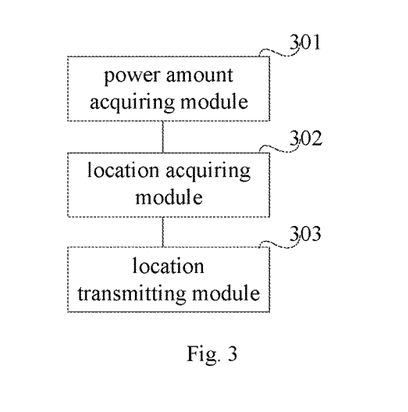
FIG. 3 is a block diagram of a device for acquiring location information, according to an example embodiment.

FIG. 3 is a block diagram of a device for acquiring location information, according to an example embodiment. The device for acquiring the location information may be applied in the mobile terminal and may include: a power amount acquiring module 301, a location acquiring module 302, and a location transmitting module 303.

The power amount acquiring module 301 is configured to acquire a remaining power amount of the mobile terminal.

The location acquiring module 302 is configured to acquire the location information of the mobile terminal when the remaining power amount of the mobile terminal acquired by the power amount acquiring module 301 is less than the preset threshold.

The location transmitting module 303 is configured to transmit the location information acquired by the location acquiring module 302 to a target receiving terminal.

In summary, by acquiring the location information and transmitting the acquired location information to the target receiving terminal when the remaining power amount of the mobile terminal is less than the preset threshold, the device provided in this embodiment avoids that the location information will be acquired only when a user manually sends a controlling instruction to the mobile terminal, which is inconvenient in operation, and the user cannot find the mobile terminal when the mobile terminal is power off due to a low power amount. The mobile terminal automatically acquires the location information and transmits the acquired location information to the target receiving terminal under a low power amount, which requires no manual trigger and control from the user and simplifies the operation on the one hand, and helps the user to find out the mobile terminal by automatically providing the location information before the mobile terminal is power off on the other hand.

Figure 4:
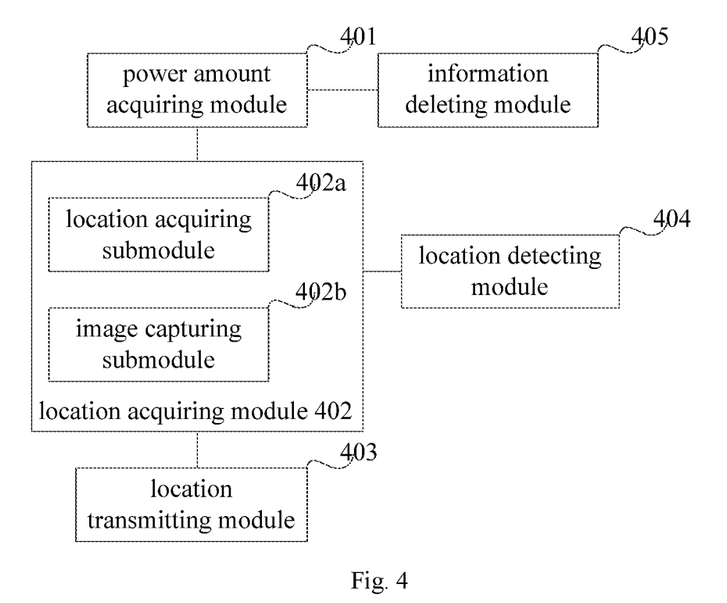
FIG. 4 is a block diagram of a device for acquiring location information, according to another example embodiment.

FIG. 4 is a block diagram of a device for acquiring location information, according to an example embodiment. The device for acquiring the location information may be applied in the mobile terminal and may include: a power amount acquiring module 401, a location acquiring module 402, and a location transmitting module 403.

The power amount acquiring module 401 is configured to acquire a remaining power amount of the mobile terminal.

The location acquiring module 402 is configured to acquire the location information of the mobile terminal when the remaining power amount of the mobile terminal acquired by the power amount acquiring module 401 is less than the preset threshold.

The location transmitting module 403 is configured to transmit the location information acquired by the location acquiring module 402 to the target receiving terminal.

In some embodiments, the location acquiring module 402 includes: a location acquiring submodule 402a and/or an image capturing submodule 402b.

The location acquiring submodule 402a is configured to acquire a current geographic location of the mobile terminal by a positioning technology.

The image capturing submodule 402b is configured to capture an image of an environment where the mobile terminal is currently located by a camera.

In some embodiments, the image capturing submodule 402b is configured to acquire a screen orientation of the mobile terminal; activate a front camera and capture the image of the environment where the mobile terminal is currently located by the front camera if the screen orientation of the mobile terminal is upward; activate a rear camera and capture the image of the environment where the mobile terminal is currently located by the rear camera if the screen orientation of the mobile terminal is downward.

In some embodiments, the device provided in this embodiment further includes: a location detecting module 404.

The location detecting module 404 is configured to detect whether the location of the mobile terminal is changed.

The location acquiring module 402 is further configured to re-acquire the location information of the mobile terminal when the location of the mobile terminal is changed.

Alternatively, the device provided in this embodiment further includes: an information deleting module 405.

The information deleting module 405 is configured to delete all the location information stored in the mobile terminal or delete location information other than location information last acquired when the remaining power amount of the mobile terminal is greater than or equal to the preset threshold.

In summary, by acquiring the location information and transmitting the acquired location information to the target receiving terminal when the remaining power amount of the mobile terminal is less than the preset threshold, the device provided in this embodiment avoids that the location information will be acquired only when a user manually sends a controlling instruction to the mobile terminal, which is inconvenient in operation, and the user cannot find the mobile terminal when the mobile terminal is power off due to a low power amount. The mobile terminal automatically acquires the location information and transmits the acquired location information to the target receiving terminal under a low power amount, which requires no manual trigger and control and simplifies the operation on the one hand, and helps the user to find out the mobile terminal by automatically providing the location information before the mobile terminal is power off on the other hand.

In addition, the device will detect whether the location of the mobile terminal is changed after acquiring the location information of the mobile terminal, and re-execute the step of acquiring the current location information of the mobile terminal if the location of the mobile terminal is changed, thus avoiding excessive power consumption or insufficient memory caused by frequently acquiring the location information without affecting the validity of the location information.

It should be noted that, in achieving the functions of the device provided in above embodiments, illustration is made merely by taking the assignation of various functional modules described above as examples. However, in practice, the above functions may be assigned to be achieved by different functional modules according to actual demand, i.e. assigning the content structure of the device into different functional modules so as to achieve all or part of the functions described above.

With respect to the device described in above embodiments, the specific ways for performing operations of the various modules thereof have been described in detail in related method embodiments, which will not be elaborated here.

There is also provided a device for acquiring location information according to an embodiment of the present disclosure, which can achieve the method for acquiring the location information according to the present disclosure. The device includes: a processor and a memory configured to store an instruction executable by the processor. The processor is configured to: acquire a remaining power amount of a mobile terminal; acquire location information of the mobile terminal when the remaining power amount of the mobile terminal is less than a preset threshold; and transmit the location information to a target receiving terminal.

In some embodiments, the processor is further configured to: acquire a current location of the mobile terminal by a positioning technology; and/or capture an image of an environment where the mobile terminal is currently located by a camera.

In some embodiments, the processor is configured to: acquire a screen orientation of the mobile terminal; activate a front camera and capture the image of the environment where the mobile terminal is currently located by the front camera if the screen orientation of the mobile terminal is upward; activate a rear camera and capture the image of the environment where the mobile terminal is currently located by the rear camera if the screen orientation of the mobile terminal is downward.

In some embodiments, the processor is further configured to: detect whether the location of the mobile terminal is changed; re-acquire the location information of the mobile terminal when the location of the mobile terminal is changed.

In some embodiments, the processor is further configured to: delete all the location information stored in the mobile terminal or location information other than location information last acquired when the remaining power amount of the mobile terminal is greater than or equal to the preset threshold.

Figure 5:
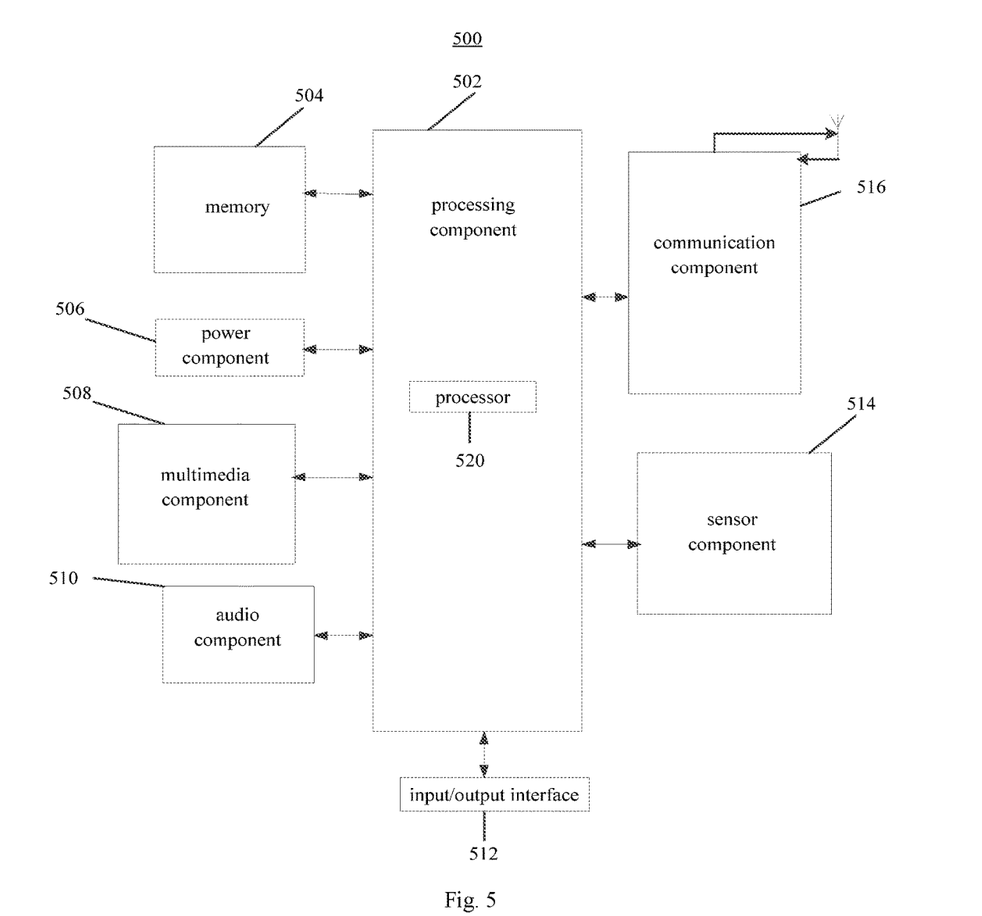
FIG. 5 is a block diagram of a device, according to an example embodiment.

FIG. 5 is a block diagram of a device 500, according to an example embodiment. For example, the device 500 may be a mobile phone, a computer, a digital broadcast terminal, a messaging device, a gaming console, a tablet, a medical device, an exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514 and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video etc. The memory 504 may be implemented using any type of volatile or non-volatile memory devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and/or the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules such as a keyboard, a click wheel, buttons and the like. The buttons may include but are not limited to a home button, a volume button, a starting button, and a locking button.

The sensor component 514 includes one or more sensors to provide status assessments of various aspects of the device 500. For instance, the sensor component 514 may detect an open/closed status of the device 500, relative location of components, e.g. the display and the keypad of the device 500, a change in location of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G or 3G or a combination thereof. In one example embodiment, the communication component 516 receives a broadcast signal or broadcast associated information from an external broadcast management system via a broadcast channel. In one example embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In example embodiments, there is also provided a non-transitory computer-readable storage medium including instructions, such as included in the memory 504, executable by the processor 520 in the device 500, for performing the above-described methods. For example, the non-transitory computer-readable storage medium may be a ROM, a random access memory (RAM), a CD-ROM, a magnetic tape, a floppy disc, an optical data storage device, and the like.

There is also provided a non-transitory computer readable storage medium, having stored therein instructions that, when executed by a processor of the device 500, causes the device 500 to perform the abovementioned method.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for acquiring location information, the method comprising:
   acquiring a remaining power amount of a mobile terminal;
   acquiring location information of the mobile terminal when the remaining power amount of the mobile terminal is less than a preset threshold;
   transmitting the location information to a target receiving terminal; and
   deleting all the location information stored in the mobile terminal when the remaining power amount of the mobile terminal is greater than or equal to the preset threshold.

2. The method of claim 1, wherein acquiring the location information of the mobile terminal comprises:
   acquiring a current geographic location of the mobile terminal by a positioning technology.

3. The method of claim 1, after acquiring the location information of the mobile terminal, further comprising:
   detecting whether the location of the mobile terminal is changed; and
   re-executing the step of acquiring the location information of the mobile terminal if the location of the mobile terminal is changed.

4. The method of claim 1, further comprising:
   deleting location information other than location information last acquired when the remaining power amount of the mobile terminal is greater than or equal to the preset threshold.

5. The method according to claim 1, wherein acquiring the location information of the mobile terminal comprises:
   capturing an image of an environment where the mobile terminal is currently located by a camera.

6. The method according to claim 5, wherein capturing an image of an environment where the mobile terminal is currently located by a camera comprises:
  acquiring a screen orientation of the mobile terminal; and
  activating a front camera and capturing the image of the environment where the mobile terminal is currently located by the front camera if the screen orientation of the mobile terminal is upward.

7. The method according to claim 5, wherein capturing an image of an environment where the mobile terminal is currently located by a camera comprises:
  acquiring a screen orientation of the mobile terminal; and
  activating a rear camera and capturing the image of the environment where the mobile terminal is currently located by the rear camera if the screen orientation of the mobile terminal is downward.

8. A device for acquiring location information, the device comprising:
  a processor; and
  a memory configured to store an instruction executable by the processor,
  wherein the processor is configured to:
  acquire a remaining power amount of a mobile terminal;
  acquire location information of the mobile terminal a when the remaining power amount of the mobile terminal is less than a preset threshold;
  transmit the location information to a target receiving terminal; and
  delete all the location information stored in the mobile terminal when the remaining power amount of the mobile terminal is greater than or equal to the preset threshold.

9. The device of claim 8, wherein the processor configured to acquire location information of the mobile terminal is further configured to:
  acquire a current geographic location of the mobile terminal by a positioning technology.

10. The device of claim 8, wherein the processor is further configured to:
  detect whether the location of the mobile terminal is changed; and
  re-execute the step of acquiring the location information of the mobile terminal if the location of the mobile terminal is changed.

11. The device of claim 8, wherein the processor is further configured to:
  delete location information other than location information last acquired when the remaining power amount of the mobile terminal is greater than or equal to the preset threshold.

12. The device according to claim 8, wherein the processor configured to acquire location information of the mobile terminal is further configured to:
  capture an image of an environment where the mobile terminal is currently located by a camera.

13. The device according to claim 12, wherein the processor configured to capture an image of an environment where the mobile terminal is currently located by a camera is further configured to:
  acquire a screen orientation of the mobile terminal; and
  activate a front camera and capture the image of the environment where the mobile terminal is currently located by the front camera if the screen orientation of the mobile terminal is upward.

14. The device according to claim 12, wherein the processor configured to capture an image of an environment where the mobile terminal is currently located by a camera is further configured to:
  acquire a screen orientation of the mobile terminal; and
  activate a rear camera and capture the image of the environment where the mobile terminal is currently located by the rear camera if the screen orientation of the mobile terminal is downward.

15. A non-transitory computer-readable storage medium having stored therein instructions that, when executed by a processor of a terminal device, causes the terminal device to perform a method for acquiring location information, the method comprising:
  acquiring a remaining power amount of a mobile terminal;
  acquiring location information of the mobile terminal when the remaining power amount of the mobile terminal is less than a preset threshold;
  transmitting the location information to a target receiving terminal; and
  deleting all the location information stored in the mobile terminal when the remaining power amount of the mobile terminal is greater than or equal to the preset threshold.

* * * * *